United States Patent
Chen

(10) Patent No.: US 8,656,977 B2
(45) Date of Patent: Feb. 25, 2014

(54) ELECTRONIC DEVICE ASSEMBLY SYSTEM AND METHOD

(71) Applicant: Po-Chou Chen, New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/653,622

(22) Filed: Oct. 17, 2012

(65) Prior Publication Data

US 2013/0233462 A1 Sep. 12, 2013

(30) Foreign Application Priority Data

Mar. 12, 2012 (TW) .............................. 101108237 A

(51) Int. Cl.
B30B 5/00 (2006.01)

(52) U.S. Cl.
USPC ......... 156/583.3; 156/228; 156/323; 156/580

(58) Field of Classification Search
USPC ............... 156/228, 323, 580, 212, 245, 583.3
See application file for complete search history.

(56) References Cited

U.S. PATENT DOCUMENTS 5,788,808 A * 8/1998 Natarajan et al. ............. 156/580
2009/0314437 A1* 12/2009 Matsumura ................... 156/580

* cited by examiner

Primary Examiner — Kataryna Wyrozebski Lee
Assistant Examiner — Carson Gross
(74) Attorney, Agent, or Firm — Altis Law Group, Inc.

(57) ABSTRACT

Provided is an assembly system for assembling a double-side adhesive onto an electronic device. The assembly system includes a supporting portion and a pushing portion. The supporting portion includes a supporting surface. The supporting surface defines a cavity for receiving the electronic device. The pushing portion is supported on the supporting surface, and includes a pushing surface opposite to the supporting surface. A projection perpendicularly extends downward from the pushing surface. An elastic member is positioned on the projection. The distance between the supporting surface and the pushing surface equals to an elastic deformation value of the elastic member in a direction substantially perpendicular to the supporting surface.

8 Claims, 2 Drawing Sheets

ELECTRONIC DEVICE ASSEMBLY SYSTEM AND METHOD

BACKGROUND

1. Technical Field

The present disclosure relates to assemblies and, particularly, to an electronic device assembly system and an electronic device assembly method.

2. Description of Related Art

The developed trends for electronic devices such as LCDs, and desktops: small size, light weight, and easy assembly and disassembly. However, current assembly of displays of electronic devices typically use threaded fasteners. However, screwing and unscrewing the threaded fasteners is inconvenient.

Therefore, it is desirable to provide an electronic device assembly system and an electronic device assembly method which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
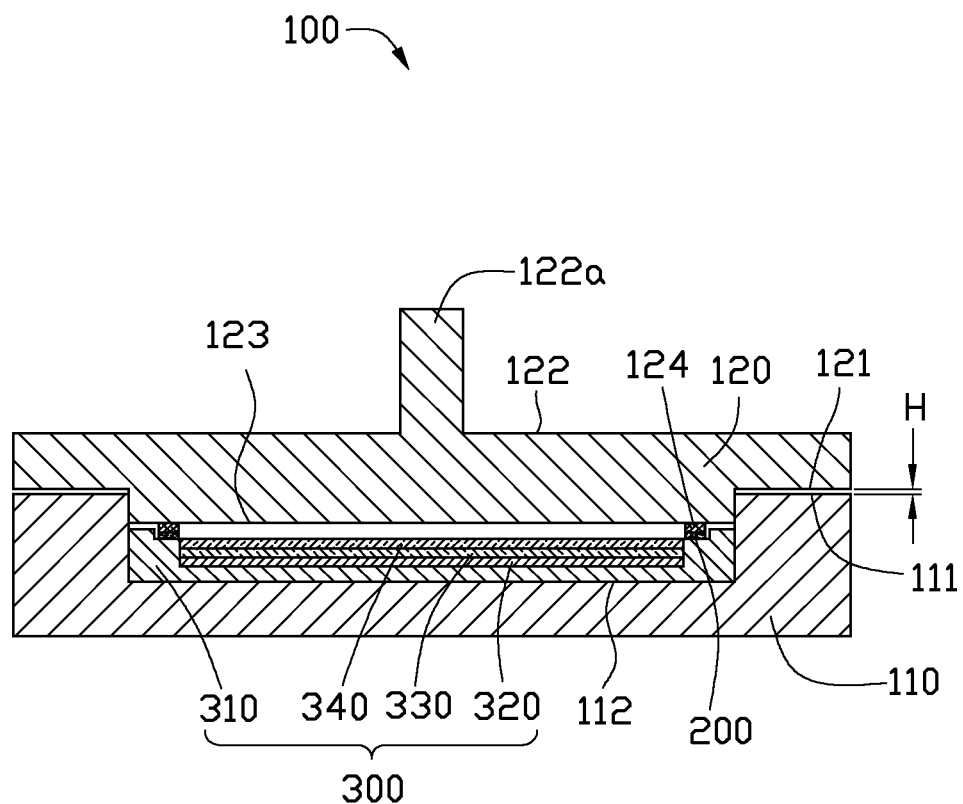
FIG. 1 is a schematic cross-sectional view of an assembly system together with an electronic device, according to an exemplary embodiment.

FIG. 1 illustrates an assembly system 100 for assembling a double-side adhesive 200 onto an electronic device 300, according to an exemplary embodiment. In the embodiment, the electronic device 300 is a backlight module. The electronic device 300 includes a frame 310, a reflective plate 320, a backlight plate 330, and a diaphragm 340.

The assembly system 100 includes a supporting portion 110 and a pushing portion 120.

The supporting portion 110 includes a supporting surface 111. The supporting surface 111 defines a cavity 112 at its center. The cavity 112 is configured for receiving the electronic device 300. In the embodiment, a depth of the cavity 112 is larger than a height of the electronic device 300 in a direction of substantially perpendicular to the supporting surface 111.

The pushing portion 120 is supported on the supporting surface 111 for pushing the double-side adhesive 200 onto the electronic device 300. The pushing portion 120 includes a pushing surface 121 opposite to the supporting surface 111 and a top surface 122 away from the pushing surface 121. A projection 123 perpendicularly extends downward from the pushing surface 121. The projection 123 spatially corresponds to the cavity 112. An elastic member 124 is positioned on a periphery of the projection 123. In the embodiment, the elastic member 124 is made of rubber. A handle 122a is integrally formed with and perpendicularly extends upward from the top surface 122 of the pushing portion 120. In the embodiment, the handle 122a is positioned at center of the top surface 122. In other embodiments, the handle 122a and the pushing portion 120 can be separately formed. The handle 122a can be attached to the top surface 122 by adhesive, welding (e.g., plastic welding), or other attaching methods.

The double-side adhesive 200 is sandwiched between the elastic member 124 and the electronic device 300. In particular, the double-side adhesive 200 is pushed on the frame 310 by the assembly system 100. In the embodiment, the distance between the supporting surface 111 and the pushing surface 121 is H, which equals to an elastic deformation value of the elastic member 124 in a direction substantially perpendicular to the supporting surface 111. As such, in the process of pushing of the pushing portion 120, as long as the pushing surface 121 is pressed to contact with the supporting surface 111, this can be guaranteed that the maximum distance of the pushing surface 121 being capable of moving equal to the elastic deformation value of the elastic member 124.

Figure 2:
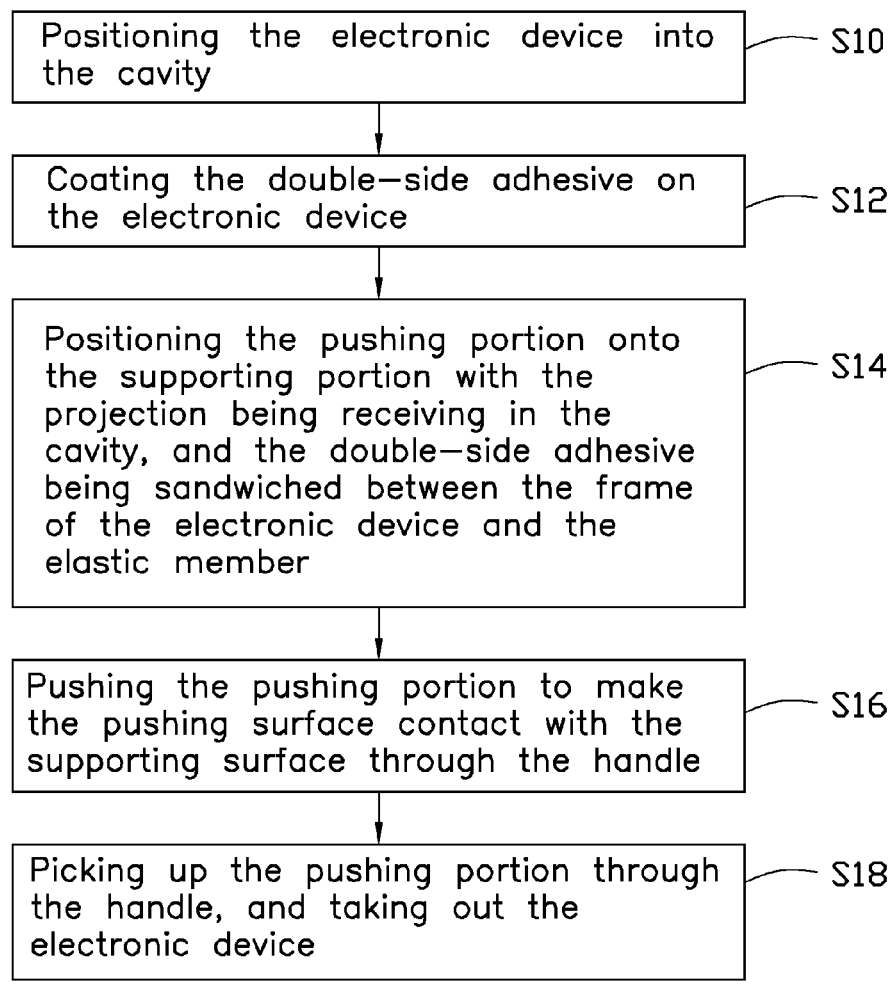
FIG. 2 is a flowchart of an assembly method, according to an exemplary embodiment.

FIG. 2 shows a flowchart of a method for assembling the double-side adhesive 200 onto the electronic device 300, according to another exemplary embodiment. The method includes the following steps S10-S18.

In step S10: positioning the electronic device 300 into the cavity 112;

In step S12: coating the double-side adhesive 200 on the electronic device 300;

In step S14: positioning the pushing portion 120 onto the supporting portion 110, with the projection 123 being receiving in the cavity 112, and the double-side adhesive 200 being sandwiched between the frame 310 of the electronic device 300 and the elastic member 124.

In step S16: pushing the pushing portion 120 to make the pushing surface 121 contact with the supporting surface 111 through the handle 124;

In step S18: picking up the pushing portion 120 through the handle 124, and taking out the electronic device 300.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An assembly system for assembling a double-side adhesive onto an electronic device, the assembly system comprising:
   a supporting portion comprising a supporting surface, the supporting surface defining a cavity for receiving the electronic device; and
   a pushing portion supported on the supporting surface, the pushing portion comprising a pushing surface opposite to the supporting surface, a projection perpendicularly extending downward from the pushing surface, and an elastic member positioned on the projection, a distance between the supporting surface and the pushing surface equaling to an elastic deformation value of the elastic member in a direction substantially perpendicular to the supporting surface, wherein the elastic member is only positioned on a periphery of the projection.

2. The assembly system of claim 1, wherein the supporting surface defines the cavity at its center.

3. The assembly system of claim 1, wherein the elastic member is made of rubber.

4. The assembly system of claim 1, wherein the pushing portion further comprises a top surface and a handle, the top surface is positioned away from the pushing surface, and the handle perpendicularly extends upward from the top surface.

5. The assembly system of claim 4, wherein the handle is integrally formed with the pushing portion.

6. The assembly system of claim 4, wherein the handle is attached to the top surface.

7. The assembly system of claim 4, wherein the handle is positioned at center of the top surface.

8. The assembly system of claim 1, wherein the projection spatially corresponds to the cavity.

* * * * *